(12) United States Patent
Sudo

(10) Patent No.: US 6,275,014 B1
(45) Date of Patent: Aug. 14, 2001

(54) SWITCHING REGULATOR CIRCUIT CAPABLE OF ELIMINATING POWER SUPPLY RECHARGING OPERATION BY REVERSE COIL CURRENT

(75) Inventor: Minoru Sudo, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/638,195

(22) Filed: Aug. 11, 2000

(30) Foreign Application Priority Data

Oct. 25, 1999 (JP) .................................................. 11-302538
Feb. 28, 2000 (JP) .................................................. 12-051460

(51) Int. Cl.⁷ ....................................................... G05F 1/10
(52) U.S. Cl. ........................................... 323/222; 323/282
(58) Field of Search .................................... 323/220, 222, 323/223, 265, 282; 363/84, 89, 125, 127

(56) References Cited

U.S. PATENT DOCUMENTS

| | | | |
|---|---|---|---|
| 5,721,483 | * 2/1998 | Kolluri et al. ........................ | 323/224 |
| 5,940,287 | * 8/1999 | Brkovic ................................. | 363/127 |
| 6,091,232 | * 7/2000 | Criscione et al. .................... | 323/222 |
| 6,151,233 | * 11/2000 | Kondo ................................... | 363/125 |

* cited by examiner

Primary Examiner—Matthew Nguyen
(74) Attorney, Agent, or Firm—Adams & Wilks

(57) ABSTRACT

A synchronous rectifying type switching regular circuit operable in a high efficiency is obtained, while a reverse current flowing through a coil is not used to charge a power supply. In a synchronous rectifying type switching regulator circuit for alternately turning ON/OFF a first switch element for controlling a current of a coil employed in the switching regulator and a second switch element connected parallel to a commutation diode, a capacitor is added to an input of the switching regulator circuit; a third switch element is interposed between a power supply such as a battery and the capacitor; and when the first switch element is turned ON, the third switch element is turned ON, whereas when the first switch element is turned OFF, the third switch element is turned OFF.

4 Claims, 4 Drawing Sheets

SWITCHING REGULATOR CIRCUIT CAPABLE OF ELIMINATING POWER SUPPLY RECHARGING OPERATION BY REVERSE COIL CURRENT

BACKGROUND OF THE INVENTION

1. Field of the Invention

The present invention generally relates to a switching regulator circuit (hereinafter referred to as SW regulator circuit) constructed of a simple circuit and operable in a high efficiency. More specifically, the present invention is directed to such a switching regulator circuit capable of eliminating a recharging operation of a power supply by a reverse current flowing through a coil.

2. Description of the Related Art

FIG. 8 shows a circuit diagram of a switching regulator circuit typically known as a conventional step-up type SW (switching) regulator circuit. In this step-up type SW regulator circuit, a power supply 10 is connected to one end of a coil 11, whereas both a switch element (hereinafter referred to as SW element) 13 and a diode 12 are connected to the other end of this coil 11. The other end of the diode 12 constitutes an output terminal of the SW regulator circuit. To this output terminal, both a capacitor 14 and a load 15 are connected, while an SW regulator control circuit 20 controls ON time and OFF time of the SW element 13 in order that the output voltage of the output terminal becomes a certain constant voltage "Vout". In the SW regulator circuit of FIG. 8, since a current flows through the diode 12, a loss occurs. To reduce this loss, as shown in FIG. 9, such a synchronous rectifying type SW regulator is conducted in which another SW element 16 is additionally connected parallel to the diode 12, and both the SW element 13 and the SW element 16 are operated in a complementary mode as represented in FIG. 10. As a result, generally speaking, a converting efficiency of a synchronous rectifying type SW regulator can be increased by approximately 5%.

In this synchronous rectifying type SW regulator, the current of the coil 11 flows via the SW element 16 along the reverse direction in the current mode other than the current continuous mode (namely, in current discontinuous mode where coil current is reduced to 0), so that this reverse coil current charges the power supply 10 which may cause a problem. This SW element 16 is connected parallel to the diode 12.

SUMMARY OF THE INVENTION

The present invention has been made to solve the above-described problem, and therefore, has an object to provide such a switching regulator circuit, according to the present invention, featured by that while a switch element is additionally provided between a coil and a power supply and also a capacitor having a large capacitance is additionally employed between the coil and the ground, this switch element is turned ON/OFF. As a result, recharging operation of the power supply by the reverse current flowing through the coil is interrupted, whereas the reverse current may charge the capacitor having the large capacitance.

More specifically, the switching regulator circuit is featured by such a synchronous rectifying type switching regulator circuit, according to a first aspect of the present invention, for alternately turning ON/OFF a first switch element for controlling a current of a coil employed in the switching regulator and a second switch element connected parallel to a commutation diode, in which: a capacitor is added to an input of the switching regulator circuit; a third switch element is interposed between a power supply such as a battery and the capacitor; and when the first switch element is turned ON, the third switch element is turned ON, whereas when the first switch element is turned OFF, the third switch element is turned OFF.

Furthermore, the switching regulator circuit is featured by such a synchronous rectifying type switching regulator circuit, according to an second aspect of the present invention, having means for detecting the current of the coil, for alternately turning ON/OFF a first switch element for controlling the current of the coil employed in the switching regulator and a second switch element connected parallel to a commutation diode, in which: a capacitor is added to an input of the switching regulator circuit; a third switch element is interposed between a power supply such as a battery and the capacitor; and when the current of the coil is decreased lower than, or equal to a preselected current value, the third switch element is turned OFF, whereas when the current of the coil is increased higher than, or equal to the preselected current value, the third switch element is continuously turned ON.

With employment of such a circuit arrangement, the switching regulator circuit operable in the high efficiency can be realized, while the power supply is not charged by the coil reverse current.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, various preferred embodiments of the present invention will be described in detail.

Embodiment 1

Figure 1:
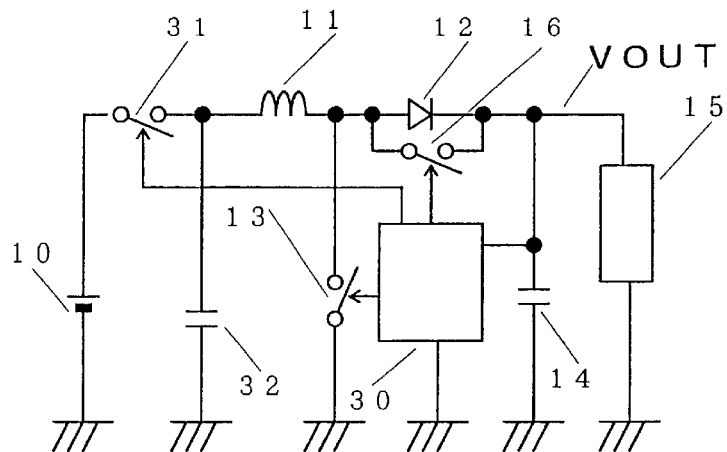
FIG. 1 is an explanatory diagram for explaining a switching regulator circuit according to Embodiment 1 of the present invention.

FIG. 1 is a circuit diagram for representing a switching regulator (SW regulator) circuit according to Embodiment 1 of the present invention. In this SW regulator circuit, a power supply 10, a coil 11, a diode 12, an output capacitor 14, a load 15, and SW elements 13/16 which are turned ON/OFF in the complementary mode are similar to those employed in the conventional SW regulator circuit. The SW regulator circuit, according to this Embodiment 1 of the present invention, is featured by that a switch element (SW element) 31 is interposed between the coil 11 and the power supply 10, and also a capacitor 32 is additionally provided at a junction point between this SW element 31 and the coil 11. An SW regulator control circuit 30 controls to turn ON/OFF 3 sets of the above-described SW elements 13, 16, and 31. As the above-described capacitor 32, such an electric double-layer capacitor having a large capacitance value, for example, larger than, or equal to 0.0001 F (100 $\mu$F) is used.

Figure 2:
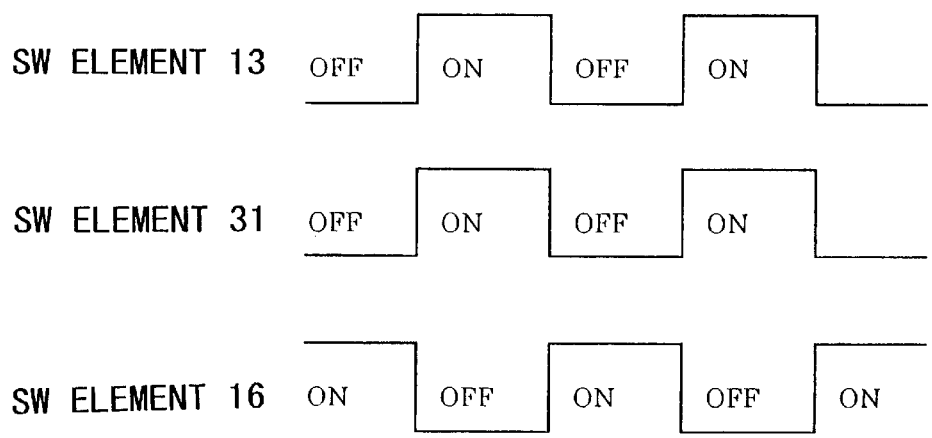
FIG. 2 is a first operation explanatory diagram for explaining the switching regulator circuit of Embodiment 1 of the present invention.

Similar to the switching operation of the conventional SW regulator circuit, the SW regulator circuit of this Embodiment 1 is operated as follows in order to keep the voltage Vout of the output terminal at a constant voltage. That is, while the SW regulator control circuit 30 ON/OFF-controls the SW element 13, this SW regulator control circuit 30 ON/OFF-controls the SW element 16 in the complementary mode with respect to the SW element 13. In this Embodiment 1, the SW regulator control circuit 30 turns ON/OFF the SW element 13 in synchronism with the SW element 31. This ON/OFF control operation is indicated in FIG. 2.

Since the SW element 13 is turned ON/OFF in synchronism with the SW element 31, when the SW element 13 and the SW element 31 are turned ON, energy is stored in the coil 11, and at the same time, the capacitor 32 is changed to voltage "Vin" of the power supply 10 in a similar manner to the conventional SW regulator circuit.

Next, when the SW element 13 and the SW element 31 are turned OFF, the energy stored in the coil 11 is discharged via the SW element 16. Since this SW element 16 is not different from a diode but owns no rectification effect, a current may flow from the coil 11 to the Vout side, and furthermore, conversely may flow from the Vout side to the coil 11.

Figure 3:
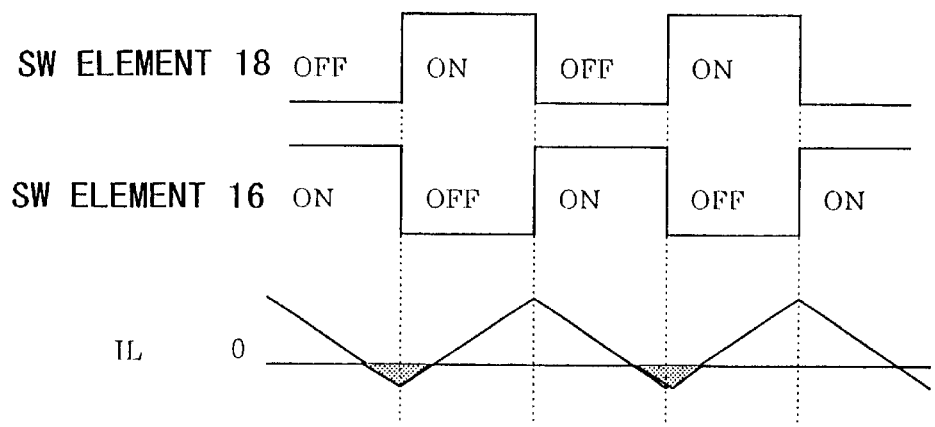
FIG. 3 is a second operation explanatory diagram for explaining the switching regulator circuit of Embodiment 1 of the present invention.

FIG. 3 represents a relationship between ON/OFF operations of the SW element 13 and the SW element 16, and a current "IL" flowing through the coil 11.

In FIG. 3, it is now assumed that such a current flowing from the coil 11 to the Vout side is defined as "+."

When both the SW element 13 and the SW element 31 are turned ON, in the case that the ON resistance of the SW element 31 is very small and is negligible, assuming now that the inductance value of the coil 11 is "L" and the voltage of the power supply 10 is "Vin", the current IL of the coil 11 is increased as follows while time "t1" has passed:

$$IL = Vin/L \times t1 + IL(t1=0)$$

In this formula, the time "t1" indicates a time duration after the SW element 13 is turned ON, and symbol IL(t1=0) represents a current of the coil 11 at the time t1=0.

When both the SW element 13 and the SW element 31 are turned OFF, assuming now that the capacitance value of the capacitor 32 is sufficiently large, the voltage of this capacitor 32 is not substantially varied from Vin, and also the inductance value of the coil 11 is "L", the coil current IL of the coil 11 is decreased as follows while time t2 has passed:

$$IL = IL(t2=0) - (Vout - Vin)/L \times t2$$

In this formula, the time "t2" indicates a time duration after the SW element 13 is turned OFF, and symbol IL (t2=0) represents a current of the coil 11 at the time t2=0.

The ON time of the SW element 13 is changed, depending upon the power supply voltage Vin, the output voltage Vout, and the condition of the load 15. As a result, as shown in FIG. 3, there are certain cases that the current of the coil 11 is reduced lower than zero depending upon the conditions. In other words, there are some possibilities that the current of the coil 11 may flow from the Vout side to the coil side (namely, coil current flow along reverse direction). However, in the SW regulator circuit of FIG. 1, a portion of this reverse current is used to charge the capacitor 32 when the SW element is turned OFF. As a result, it is possible to suppress this reverse current from charging the power supply 10. In the SW regulator circuit of FIG. 1, since approximately half of the reverse current is used to charge the capacitor 32, a total value of the reverse current flowing through the power supply 10 can be eventually suppressed by approximately ½.

Embodiment 2

Figure 4:
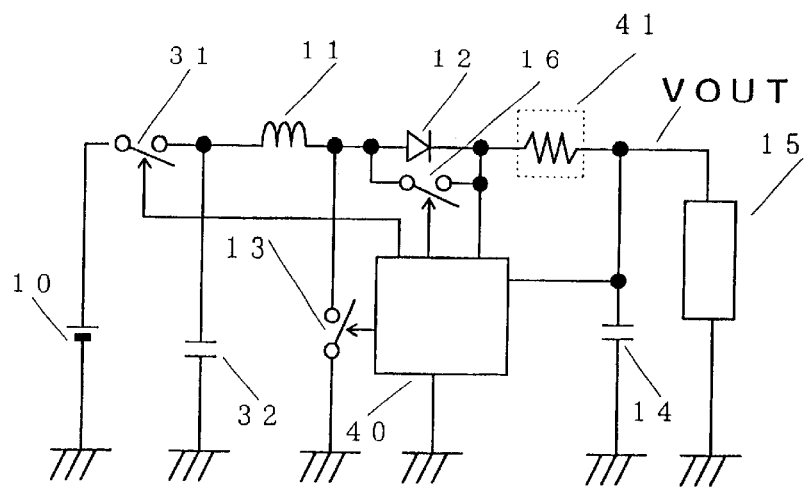
FIG. 4 is an explanatory diagram for explaining a switching regulator circuit according to Embodiment 2 of the present invention.

FIG. 4 is a circuit diagram for showing a control circuit of a switching (SW) regulator circuit according to Embodiment 2 of the present invention. A point of difference between the second SW regulator circuit and the first SW regulator circuit of Embodiment 1 is that a current detecting circuit 41 is newly employed, and the SW regulator control circuit 40 controls the SW element 31 in response to the detection output of the current detecting circuit 41. As previously explained, the current IL of the coil 11 is made different, depending upon the power supply voltage Vin, the output voltage Vout, and the condition of the load 15.

Figure 5:
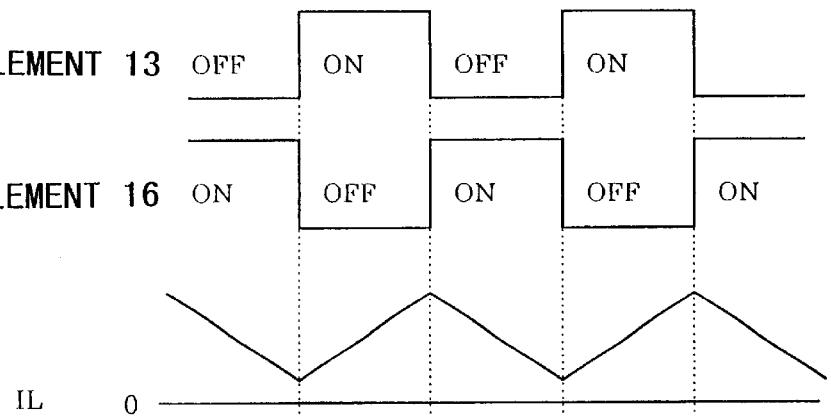
FIG. 5 is a first operation explanatory diagram for explaining the switching regulator circuit of Embodiment 2 of the present invention.

FIG. 5 represents a relationship between ON/OFF operations of the SW elements 13 and 16 and the current IL of the coil 11 under a condition different from that of FIG. 3.

Figure 6:
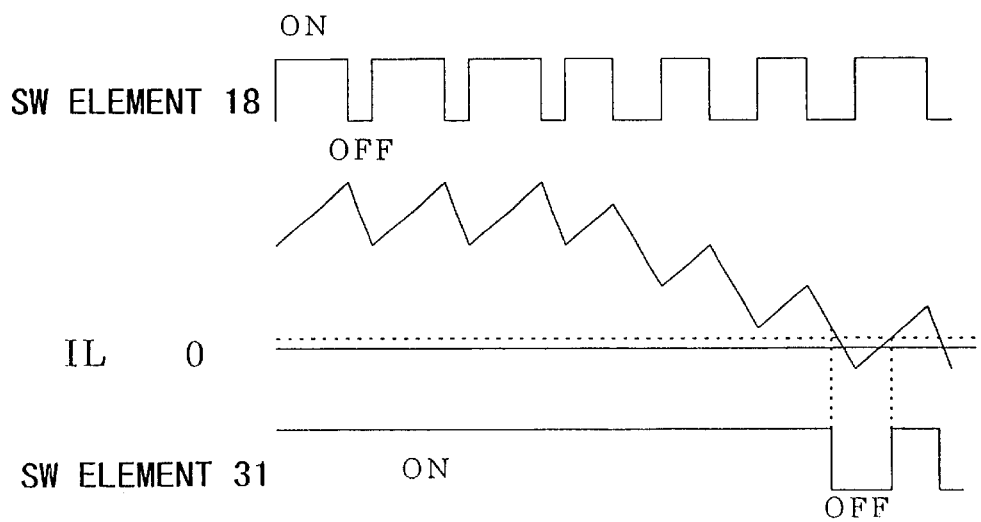
FIG. 6 is a second operation explanatory diagram for explaining the switching regulator circuit of Embodiment 2 of the present invention.

Similar to FIG. 3, it is so assumed that as to the coil current IL shown in FIG. 5, a current flows from the coil 11 to the Vout side is set to +(plus). Under the condition of FIG. 5, the current IL of the coil 11 is always +(plus), and continuously flows from the coil 11 to the Vout side. Under this condition, even when both the SW element 13 and the SW element 16 are turned ON/OFF in a complementary mode, the coil current never flows along the reverse direction. In the circuit of FIG. 4, while the current of the coil 11 is detected by the current detecting circuit 41, when the coil current becomes larger than, or equal to a certain plus (+) value, the SW element 31 remains under ON state. When the current of the coil 11 is decreased smaller than a certain plus value, the SW element 31 is conversely turned OFF. This condition is indicated in FIG. 6.

Generally speaking, as a method for detecting a current, as indicated in FIG. 4, while a resistive element is employed, a voltage produced between both ends of this resistive element is monitored so that a current can be easily detected.

In this case, a reverse current of the coil 11 does not cause the power supply 10 to be charged.

In the case of Embodiment 2 shown in FIG. 4, a start-up circuit is additionally required in order that when the power supply is turned ON, the SW element 31 is compulsorily turned ON, and thus, the capacitor 32 is charged. That is, this start-up circuit is operated as follows: For instance, when the power supply is turned ON, this start-up circuit continuously turns ON the SW element 31 until the voltage of the capacitor 32 becomes substantially equal to the voltage of the power supply 10 (namely, until the capacitor 32 is charged by the power supply 10), during which both the SW element 13 and the SW element 16 may be turned OFF.

In Embodiment 1 and Embodiment 2, the capacitor 32 connected to the junction point between the SW element 31 and the coil 11 may play the same role as that of the power supply when the SW element 31 is turned OFF. As a consequence, while the SW element 31 is turned OFF, the terminal voltage at the capacitor 32 must keep substantially the same voltage as the voltage Vin of the power supply 10.

Assuming now that the time period during which the SW element 31 is turned OFF is selected to be 5 $\mu$S (50% duty cycle of frequency of 100 KHz) and an average current supplied from the coil 11 to the output terminal is selected to be 100 mA, when the capacitance value of the capacitor 32 is selected to be 0.0001 F, a voltage variation $\Delta$Vc of the capacitor 32 during this time period is defined as follows:

$$\Delta Vc=0.1\times 5E-6/0.0001=5E-3[V]$$

In other words, the following fact may be revealed. That is, there is substantially no variation in the voltage of the capacitor 32 during this time period. As such a large capacitance of 0.0001 F (=100 $\mu$F), for instance, an electric double-layer capacitor may be employed.

Figure 7:
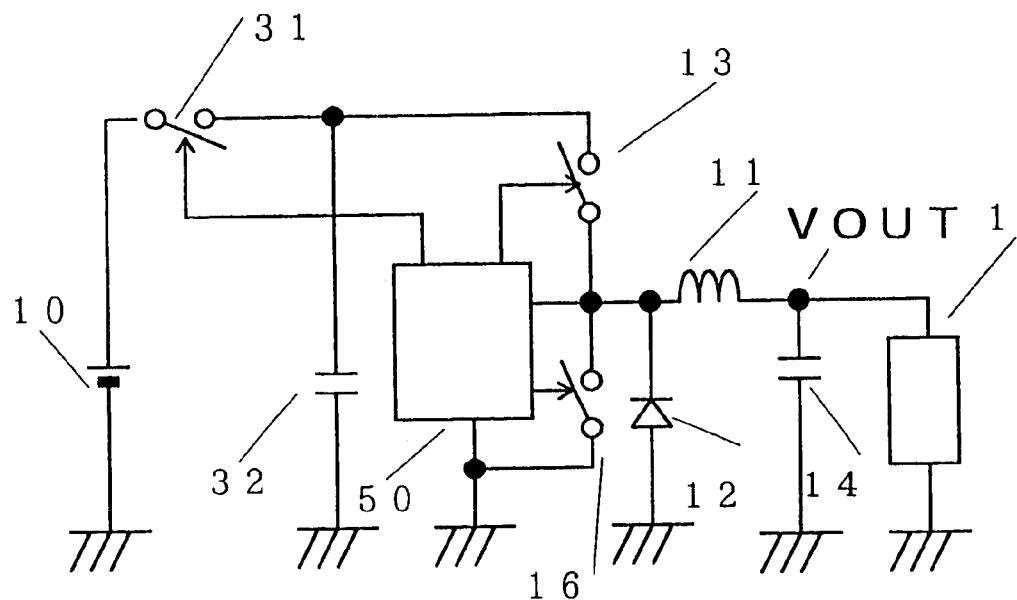
FIG. 7 is an explanatory diagram for describing a step-down type switching regulator circuit corresponding to Embodiment 1 of the present invention.
Figure 8:
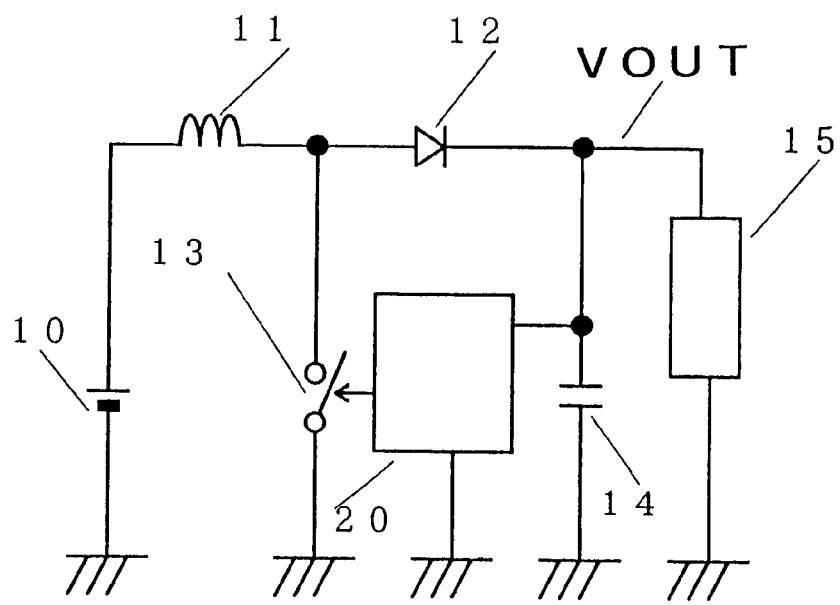
FIG. 8 is an explanatory diagram for explaining the conventional switching regulator circuit.
Figure 9:
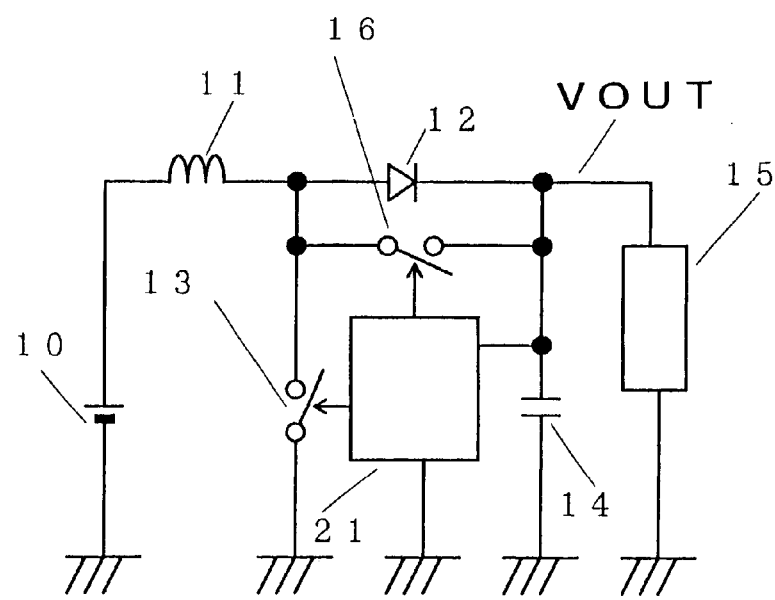
FIG. 9 is an explanatory diagram for explaining the conventional synchronous rectifying type switching regulator circuit.
Figure 10:
FIG. 10 is an operation explanatory diagram for explaining the conventional synchronous rectifying type switching regulator circuit.
Figure 10:
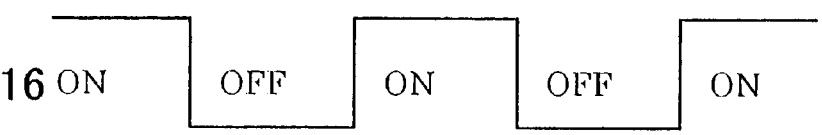

Also, in both Embodiment 1 and Embodiment 2, the step-up type SW regulator circuits have been described. Alternatively, the present invention may be similarly realized by way of a step-down type SW regulator circuit. An example of this step-down type SW regulator circuit is indicated in FIG. 7. FIG. 7 is a step-down type SW regulator circuit corresponding to Embodiment 1. Similarly, it is apparent that the present invention may be applied to an inverting type SW regulator.

As previously explained in detail, in accordance with the present invention, the following advantage can be realized. That is, the SW regulator circuit operable in the high efficiency can be realized, while the power supply is not charged by the reverse current flowing through the coil.

What is claimed is:

1. A synchronous rectifying type switching regulator circuit for alternately turning ON/OFF a first switch element for controlling a current of a coil employed in the switching regulator and a second switch element connected parallel to a commutation diode, wherein:

a capacitor is added to an input of said switching regulator circuit;

a third switch element is interposed between a power supply such as a battery and said capacitor; and when said first switch element is turned ON, said third switch element is turned ON, whereas when said first switch element is turned OFF, said third switch element is turned OFF.

2. A switching regulator circuit as claimed in claim 1 wherein:

a capacitance value of the capacitor which is added to the input of the switching regulator circuit is selected to be larger than, or equal to 0.0001 F.

3. A synchronous rectifying type switching regulator circuit having means for detecting a current of a coil, for alternately turning ON/OFF a first switch element for controlling the current of the coil employed in the switching regulator and a second switch element connected parallel to a commutation diode, wherein:

a capacitor is added to an input of said switching regulator circuit;

a third switch element is interposed between a power supply such as a battery and said capacitor; and when the current of said coil is decreased lower than, or equal to a preselected current value, said third switch element is turned OFF, whereas when the current of said coil is increased higher than, or equal to said preselected current value, said third switch element is continuously turned ON.

4. A switching regulator circuit as claimed in claim 3 wherein:

a capacitance value of the capacitor which is added to the input of the switching regulator circuit is selected to be larger than, or equal to 0.0001 F.

* * * * *